(12) United States Patent
Larsen et al.

(10) Patent No.: US 7,738,150 B2
(45) Date of Patent: Jun. 15, 2010

(54) HOLOGRAM METHODS FOR SIGNATURE SECURITY, CONSOLIDATED CONTENT, AND AN ACCELEROMETER

(75) Inventors: Glen C. Larsen, Issaquah, WA (US); Tyler Scott Gleghorn, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 641 days.

(21) Appl. No.: 11/295,626

(22) Filed: Dec. 7, 2005

(65) Prior Publication Data

US 2007/0127096 A1    Jun. 7, 2007

(51) Int. Cl.
*G03H 1/00* (2006.01)
(52) U.S. Cl. .......................................... 359/2; 359/900
(58) Field of Classification Search .................... 359/2, 359/900
See application file for complete search history.

(56) References Cited

U.S. PATENT DOCUMENTS

| | | | |
|---|---|---|---|
| 5,282,066 A | 1/1994 | Yu et al. | |
| 6,020,985 A | 2/2000 | McLeod et al. | |
| 6,290,062 B2 | 9/2001 | Ohno et al. | |
| 6,547,137 B1 | 4/2003 | Begelfer et al. | |
| 6,852,397 B2 | 2/2005 | Toshine et al. | |
| 6,887,546 B2 | 5/2005 | Morii et al. | |
| 7,088,440 B2 * | 8/2006 | Buermann et al. | 356/138 |
| 2002/0104240 A1 | 8/2002 | Howell et al. | |
| 2002/0191234 A1 | 12/2002 | Ishimoto et al. | |
| 2004/0030732 A1 | 2/2004 | Gerspach et al. | |
| 2004/0045204 A1 | 3/2004 | Miano et al. | |
| 2004/0210319 A1 * | 10/2004 | Lapstun et al. | 700/1 |
| 2004/0265552 A1 | 12/2004 | Lutz et al. | |
| 2005/0077488 A1 | 4/2005 | Nekrasov et al. | |
| 2005/0162398 A1 * | 7/2005 | Eliasson et al. | 345/173 |

(Continued)

FOREIGN PATENT DOCUMENTS

EP    0847931 B1    6/1998

(Continued)

OTHER PUBLICATIONS

"About Security Holograms, Hologram Labels, Hologram Stickers," printed from http://www.securityhologram.com/home.php (printed Sep. 13, 2005) 2 pages.

(Continued)

*Primary Examiner*—Stephone B Allen
*Assistant Examiner*—Jennifer L. Doak
(74) *Attorney, Agent, or Firm*—Merchant & Gould

(57) ABSTRACT

Techniques for identifying encoded digital data in a multi-channel hologram are described. A method can include steps of reading a first channel of a multichannel hologram, extracting first content data stored in the first channel, reading a second channel of the multichannel hologram, extracting second content data stored in the second channel, and utilizing the extracted content data. The extracted content data may be used for digital signature recognition. A system can include a multichannel hologram configured to store first, second, and third content data at first, second, and third channels respectively, at least one optical sensor configured to read the first, second, and third channels of the multichannel hologram and extract the first, second, and third content data, and a processor configured to measure an acceleration when the system is acted upon by a force.

18 Claims, 16 Drawing Sheets

U.S. PATENT DOCUMENTS

2008/0123908 A1* 5/2008 Waldman et al. ............ 382/124

FOREIGN PATENT DOCUMENTS

GB          2278098 A      11/1994

OTHER PUBLICATIONS

"JDS Uniphase Offers Secure Alternative to Holograms," printed from http://www.jdsu.com/index.cfm?pagepath=News/News_Releases&printable=true&newsid=346&id=1851 (printed on Sep. 13, 2005) 2 pages.

"Security Hologram Label and Holograms," printed from http://www.holomall.com/ (printed on Sep. 13, 2005) 5 pages.

"Genuine Product/Authentic Guaranteeed," printed from http://www.3dprint.com/index.php?action=buy&id=39 (printed on Sep. 13, 2005) 2 pages.

* cited by examiner

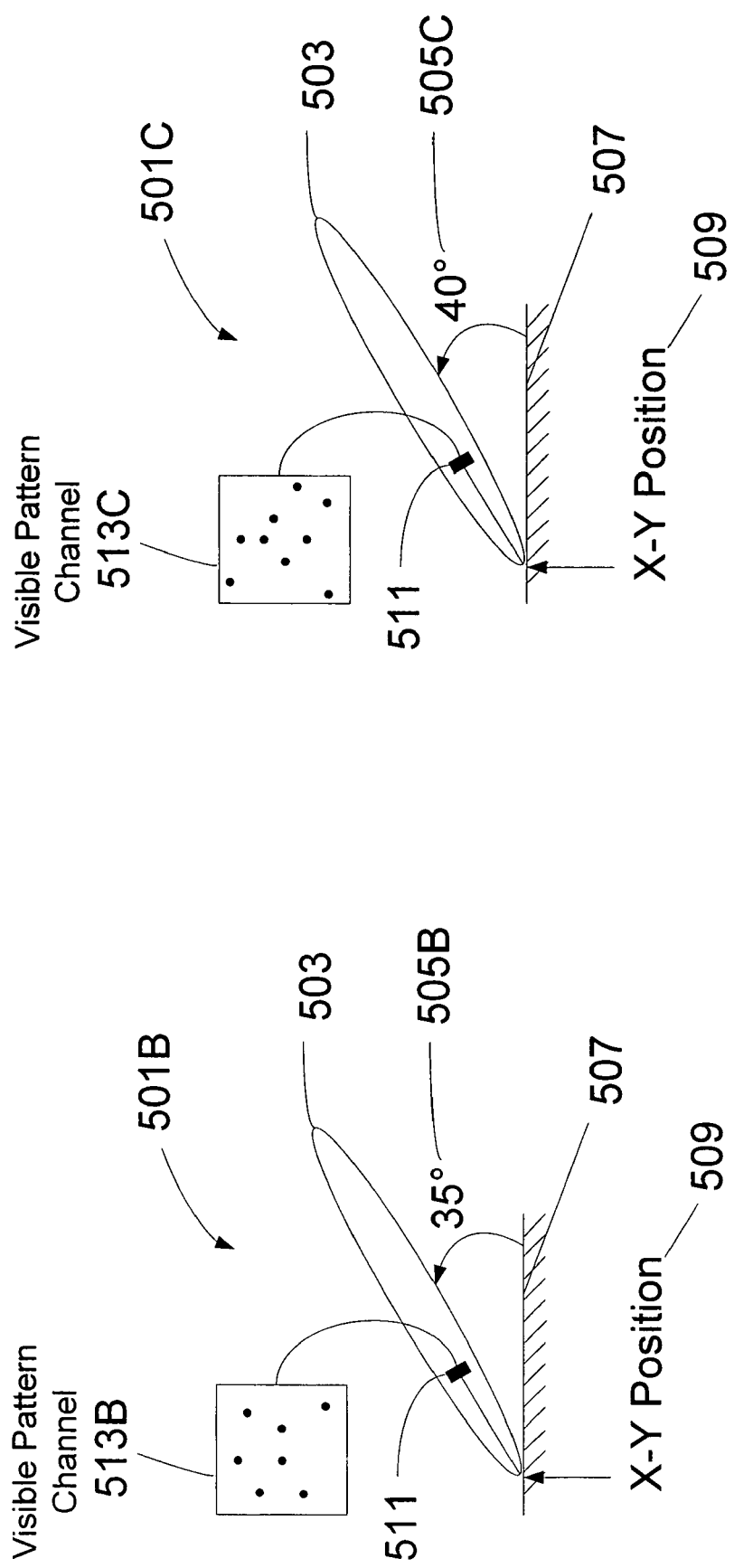

HOLOGRAM METHODS FOR SIGNATURE SECURITY, CONSOLIDATED CONTENT, AND AN ACCELEROMETER

BACKGROUND

As the demand for computers and other electronic devices in both the workforce and personal life has increased, so has the number of devices to perform the associated functions. Numerous manufacturers have emerged to develop the various devices needed to fill the demand. As these devices get smaller, and as ergonomics become increasingly important, it becomes more challenging to find space for a label on a device to provide device specific and other information. One example is in a product where there is a significant industrial design element and a desire to minimize text on the product, such as serial numbers, bar codes, and product numbers.

A further complication exists with an increased desire for global products which generates the need for incremental country localization. Broadening the number of countries a company may desire to market their product increases the number of required agency and regulatory marks on the product. It would be beneficial if there was a way to minimize the footprint or space used for these marks and text.

In addition, there is a continued need for higher quality and lower cost acceleration sensors and force sensors. Accelerometers, gyros, and force sensors are used in many industries for inertial navigation, shock test equipment, vibration measurement, and product packaging evaluation. For example, electronic devices are susceptible to vibrations and other movements during any type of transport of the devices and the impact of such vibrations can ultimately damage or render useless the devices. Prior to shipment of such electronic devices, manufacturers spend time and money to test shipping methods and different types of packaging for transport. Additional manners for measuring the amount of acceleration a package frame or other object may be subjected to would also be beneficial. Also, generalized measurement devices and methods are needed for measuring acceleration beyond a single dimension, into two dimensional and three dimensional applications.

SUMMARY

There exists a need for consolidated information content or content with a reduced footprint that allows for multiple indicia of textual and/or image information to occupy a smaller area of a device in addition to devices that can read the content. The system provides an area configured to include multiple, two or more, channels of content which may be seen by viewing the area at different angles. Different country agency indicia, product specific indicia, and/or manufacturer indicia may be included in the multiple channels of content. Other content may include encoded machine readable content, such as bar codes, dot and/or line patterns, and symbols.

Multiple channels of content may be molded directly into plastic or be invisible. The channels of content may be detected using a particular light source, such as laser light. Also, a hologram may be used as an internal or external tracking surface where digital content may be included in different channels of the hologram for an optical device to retrieve based on the relative angle between the hologram and the optical engine.

In addition, a manner for measuring the amount of acceleration a package frame or other object may be subjected to can be provided. Aspects are directed to an accelerometer/gyroscope that utilizes a multichannel hologram for measurement of the acceleration that a package frame or other object is subjected to by a force.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIGS. 5A-5C illustrate examples of identifying different channels of content data in a multichannel hologram in accordance with at least one aspect of the present invention;

DETAILED DESCRIPTION

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

Figure 1:
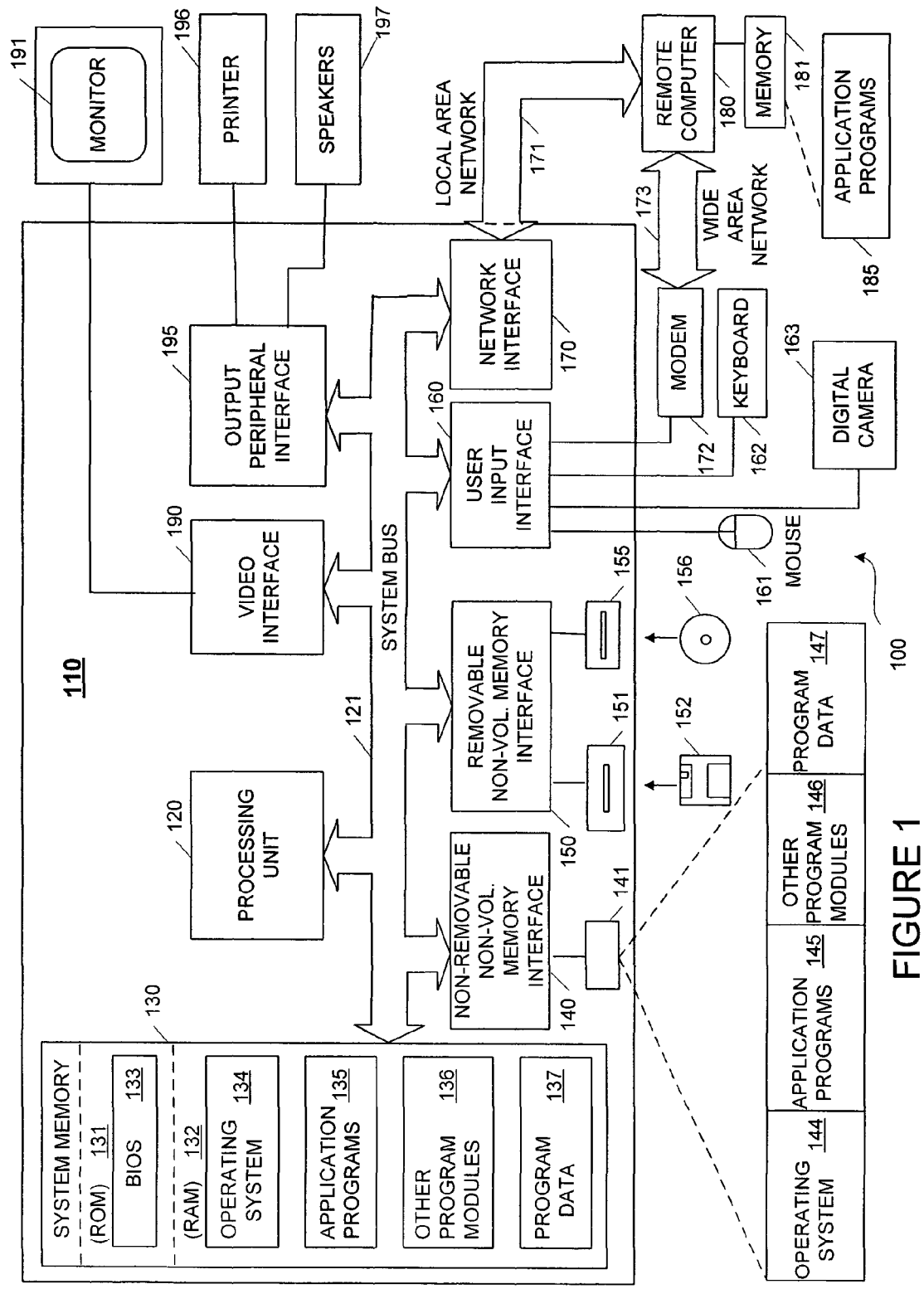
FIG. 1 illustrates a schematic diagram of a general-purpose digital computing environment in which certain aspects of the present invention may be implemented.

FIG. 1 illustrates an example of a suitable computing system environment 100 on which one or more aspects of the invention may be implemented. The computing system environment 100 is only one example of a suitable computing environment and is not intended to suggest any limitation as to the scope of use or functionality of the invention. Neither should the computing system environment 100 be interpreted as having any dependency nor requirement relating to any one or combination of components illustrated in the exemplary computing system environment 100.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a digital camera 163, a keyboard 162, and pointing device 161, commonly referred to as a mouse, trackball or touch pad. Other input devices (not shown) may include a pen, stylus and tablet, microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
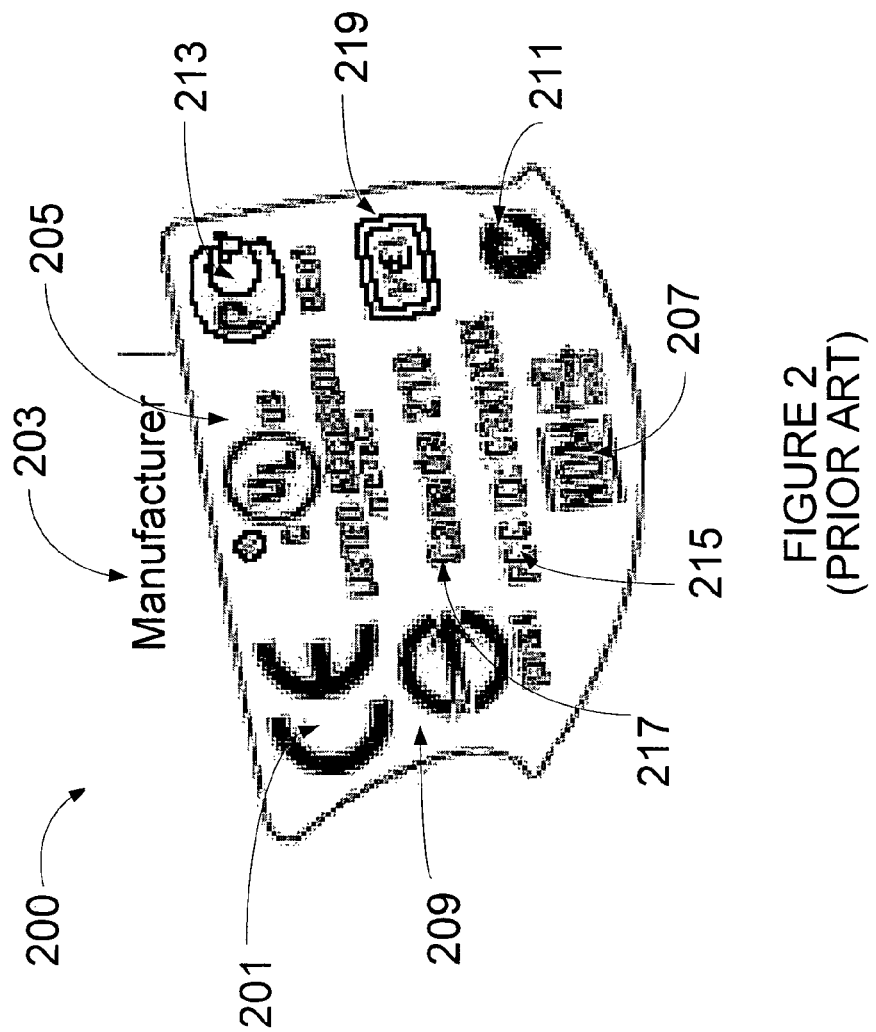
FIG. 2 illustrates a conventional product label.

FIG. 2 illustrates a conventional product label that is used on various electronic and other types of products. For example, product label 200 may be product label used on a mouse, a keyboard, or other computer peripheral. As shown, product label 200 may include a variety of company logos 203, agency and regulatory marks 201, 205, 207, 209, 211, 213, 215, 217, and 219, bar codes, serial numbers, product numbers, and other information. If any more indicia were needed to be placed on product label 200, it would be necessary to expand the label 200 to cover a larger area to create space for the new indicia.

Figure 3:
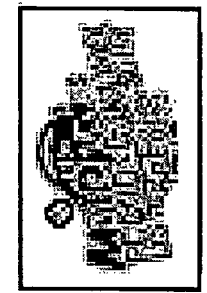
FIG. 3 illustrates an example of a multichannel hologram in accordance with at least one aspect of the present invention.

FIG. 3 illustrates an example of a multichannel hologram in accordance with at least one aspect of the present invention. Multichannel hologram 300 includes a number of different content data, such as company logos, agency and regulatory marks, bar codes, serial numbers, product numbers, and other information. However, instead of having the ten individual 10 mm×10 mm indicia 201-219 on a label 200 requiring a total of 1000 sq. mm of label area, multichannel hologram 300 is configured to occupy the area of one indicia, 10 mm×10 mm, with ten separate channels of content data which may be read by viewing at different angles. It should be understood by those skilled in the art that the terms "hologram" and "holographic technology" includes lenticular lenses and lenticular lens technology.

In effect, by utilizing holographic technology in this manner, multiple content data may be consolidated, occupying the same surface area as a single indicium. Multiple holographic channels of content data may be applied to a label 300 or molded directly into a plastic housing of a product. In another illustrative embodiment, the content data may be invisible to the human eye, requiring a laser light source or other type of light source for detection. In general, content data on multiple channels may be organized in a linear fashion, as in a stack of indicia which may be seen by rotating the multichannel hologram 300 about a horizontal axis or alternatively about a vertical axis. Multiple channels of content data may also be organized in a matrix fashion, as in an array of indicia which can be observed by simultaneously rotating the multichannel hologram 300 vertically and horizontally in order to view the desired content data.

Figure 4:
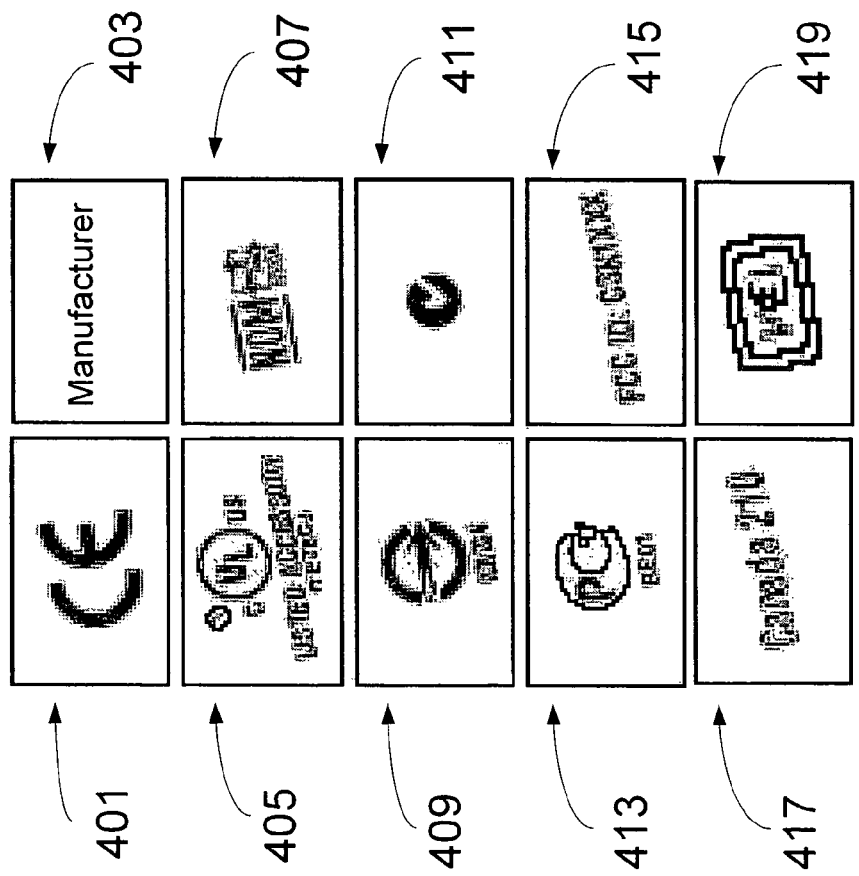
FIG. 4 illustrates examples of textual and/or image content data for respective channels in the multichannel hologram of FIG. 3 in accordance with at least one aspect of the present invention.

FIG. 4 illustrates examples of textual and/or image content data for respective channels in the multichannel hologram of FIG. 3 in accordance with at least one aspect of the present invention. Each indicium 401-419 may be included on separate channels of the multichannel hologram 300 and read by a device with an optical sensor when viewed at different angles. Content data 401 may be read when an optical device reads a first channel at a first angle. Content data 403 may be read when the optical device reads a second channel at a second angle. Content data 405 may be read when the optical device reads a third channel at a third angle. Other content data, such as 407-419, may be read when the optical device reads other channels at other different angles. Content data 401-419 may be graphical data, textual data, encoded data, metadata, an index, or other types of data. An illumination source, not shown, may be used to allow an optical device to read content data. Examples of illumination sources include ambient light, directed light, incoherent light, laser light, incandescent light, fluorescent light, visible light, infrared light, and ultraviolet light, among others.

Figure 5A:
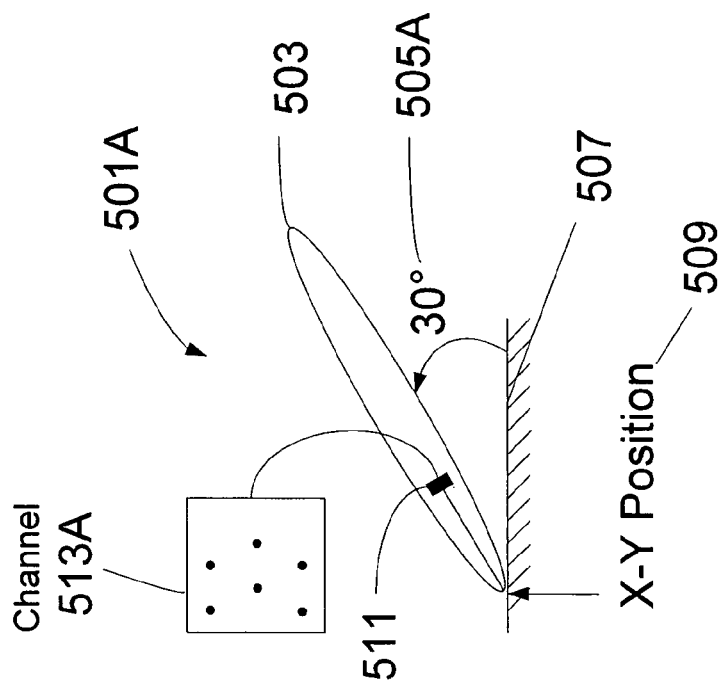

FIGS. 5A-5C illustrate examples of identifying different channels of content data in a multichannel hologram 507 in accordance with at least one aspect of the present invention. Digital data may be encoded into a multichannel hologram 507 which may be read by an optical sensor 511. The encoded digital data may be in prepared surfaces such as paper. A multichannel hologram 507 is oriented at an angle to an optical device 503 which reads a pattern of symbols, such as dots, lines, etc, on one channel of the multichannel hologram 507. Optical device 503 may be an electronic pen with a built in optical sensor 511 configured to read content data. Although not shown in this example, optical device 503 may include a light source for use in reading digital content data invisible to the human eye.

If the relative angle between the multichannel hologram area 507 and the optical device 503 changes, another channel of content data comes into view of the optical sensor 511, while the previous channel fades out. By changing the relative angle between the multichannel hologram 507 and the optical device 503, multiple different channels may be read by the optical device 503, effectively multiplying the amount of area available for data encoding by the number of channels in the multichannel hologram. In effect, an optical device 503, such as an electronic pen, may see multiple channels of content data, one channel at a time per viewing angle, depending on the tilt angle of the electronic pen 503.

In scenario 501A, optical device 503 is positioned over an X-Y position 509 of a multichannel hologram 507 at an angle 505A of 30° with reference to the label 507. At angle 505A, visible pattern channel 513A may be read by an optical sensor 511 of the optical device 503. In scenario 501B, the angle 505B of the optical device 503 has been changed to 35°. At angle 505B, visible pattern channel 513B may be read by the optical sensor 511 of the optical device 503. Finally, in scenario 501C, the angle 505C of the optical device 503 has been changed to 40°. At angle 505C, visible pattern channel 513C may be read by the optical sensor 511 of the optical device 503. In each of the scenarios 5OA-501C, different channels 513A-513C of the multichannel hologram 507 may be read by the optical device 503 over the same area 509 of the multichannel hologram 507.

Minimum angle differentials may be needed to encode different channels of data. For example, in a multichannel hologram that includes ten distinctive channels of content data, a particular channel of content data may be read within a five degree range of angles, such as between 40° and 45°, 45° and 50°, 50° and 55°, and so on. The angle range may be dependent on the capabilities of the optical device and/or the multichannel hologram. Although shown with reference to an electronic pen in these examples, it should be understood by those skilled in the art that an optical sensor 511 may alternatively be included within a trackball, optical mouse, or other types of electronic devices for purposes of monitoring input button activation, z-wheel horizontal or vertical scrolling, encoding wheels, X-Y navigation, and/or tilt sensing.

Various configurations of the hologram 507, the optical sensor 511, the field of view of the optical sensor 511, the angle 505, and the optical device 503 may be arranged. Those skilled in the art should appreciate that the present invention is not limited to any one configuration. For example, one or more of the components may be configured to allow for a movable internal multichannel hologram tracking surface relative to a stationary optical sensor. In another illustrative embodiment, a stationary internal hologram tracking surface may be configured relative to a movable optical sensor. Still further, a movable optical sensor for detecting content data on different hologram channels may be external to the optical device. In still another illustrative embodiment, a stationary optical sensor may retrieve multichannel hologram content data of multiple channels simultaneously by utilizing a lens that separates portions of the field of view of the optical sensor.

Figure 6A:
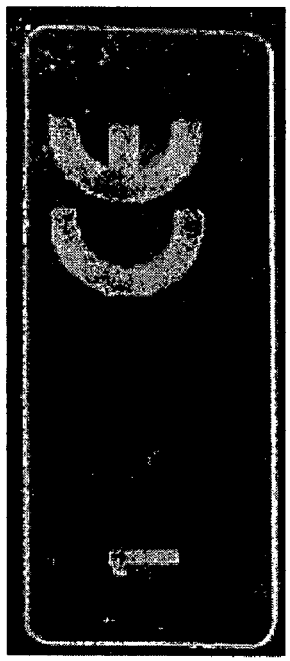
FIGS. 6A-6C illustrate examples of a multichannel hologram in accordance with at least one aspect of the present invention.
Figure 6B:
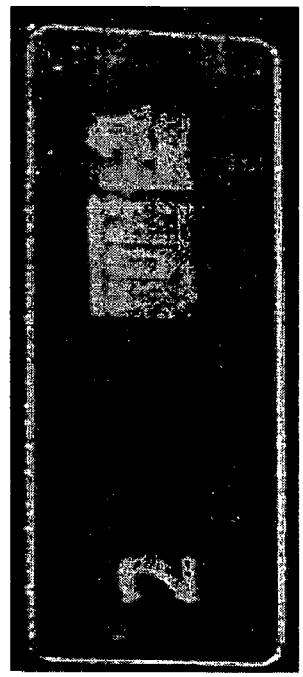
Figure 6C:
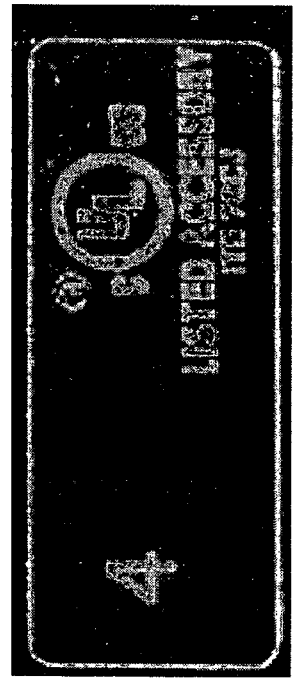

FIGS. 6A-6C illustrate examples of a multichannel hologram in accordance with at least one aspect of the present invention. The multichannel hologram shown in FIGS. 6A-6C show three different agency indicia when an optical device used to read the content data of a channel is at a corresponding angle. As shown, each of the three indicia occupies the same general area of the multichannel hologram. When an optical sensor is at a first angle with respect to the label, a first channel of content data is seen as shown by example in FIG. 6A. At a second angle, a second channel of content data is seen as shown by example in FIG. 6B. Finally, at a third angle, a third channel of content data is seen as shown by example in FIG. 6C.

Figure 7:
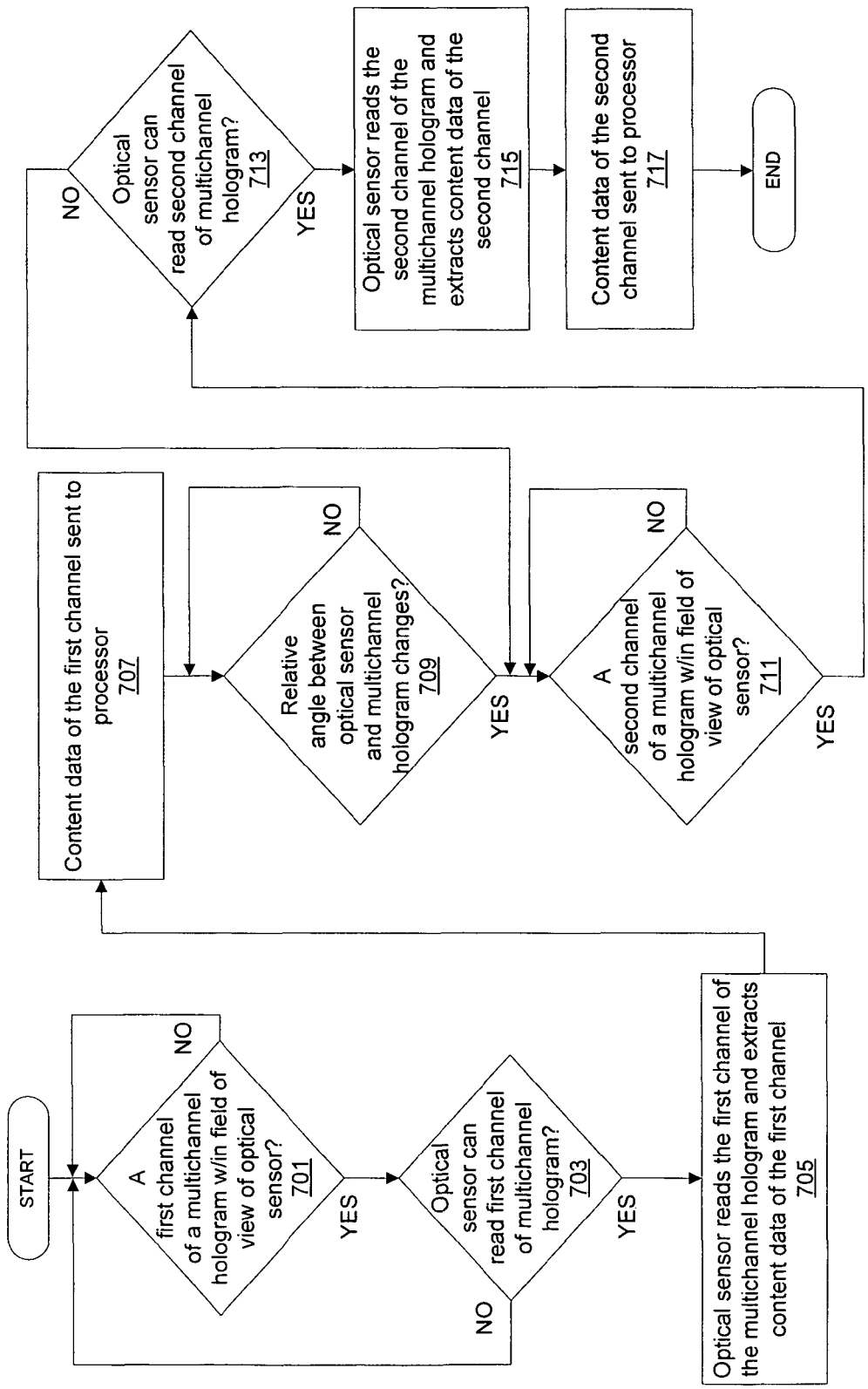
FIG. 7 is a flowchart of an illustrative example of a method for identifying different channels of a multichannel hologram in accordance with at least one aspect of the present invention.

FIG. 7 is a flowchart of an illustrative example of a method for identifying different channels of a multichannel hologram in accordance with at least one aspect of the present invention. The process starts at step 701 where a determination is made as to whether a first channel of a multichannel hologram is within the field of view of an optical sensor. If not, the process waits until a first channel is in the field of view. If a first channel is within the field of view, another determination is made at step 703 as to whether the optical sensor can read the first channel of the multichannel hologram. If not, the process return to step 701, else the process moves to step 705.

At step 705, the optical sensor reads the first channel of the multichannel hologram and extracts content data maintained at the first channel. As described herein, the content data may be a company logo, product specific indicium such as a model number or serial number, an agency or regulatory indicium, an image, textual data, and/or other content. Moving to step 707, the extracted content data of the first channel is sent to a processor. Although not described in this example, the extracted content data may be used by the processor in some type of application program. For example, an application program may use the content data for tracking products by serial number. An application program may also decode an encoded or encrypted pattern or symbol or other content into a different form, such as a pattern(s) to a symbol(s) or a symbol(s) to a pattern(s).

Proceeding to step 709, a determination is made as to whether the relative angle between the optical sensor and the multichannel hologram changes. If not, the process waits until a change is made. Once a change in the relative angle occurs, the method moves to step 711 where another determination is made as to whether a second channel of the multichannel hologram is within the field of view of the optical sensor. If not, the process waits until a second channel is in the field of view. If a second channel is within the field of view, another determination is made at step 713 as to whether the optical sensor can read the second channel of the multichannel hologram. If not, the process return to step 711, else the process moves to step 715.

At step 715, the optical sensor reads the second channel of the multichannel hologram and extracts content data maintained at the second channel. Moving to step 717, the extracted content data of the second channel is sent to the processor. Again, the processor may use the content data extracted from the second channel in an application program.

Figure 8:
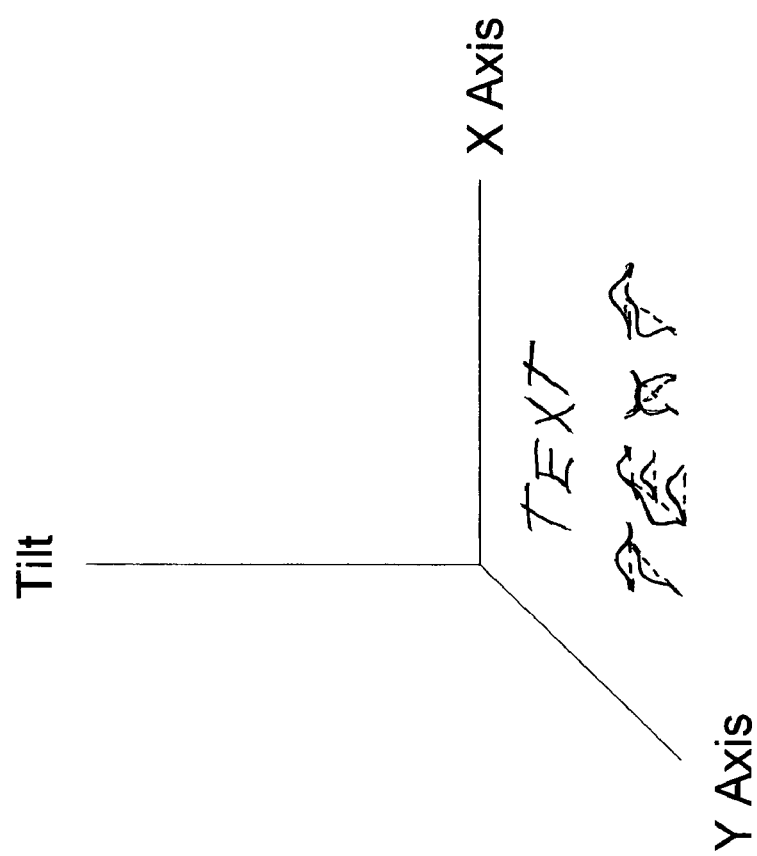
FIG. 8 illustrates an example of security monitoring by way of identifying biometric elements of a multichannel hologram digital signature in accordance with at least one aspect of the present invention.

Another application of a multichannel hologram is for security and digital handwriting, such as a digital signature, recognition. FIG. 8 illustrates an example of security monitoring by way of identifying biometric elements of a multichannel hologram digital handwriting in accordance with at least one aspect of the present invention. Since each channel of a multichannel hologram corresponds to a particular tilt angle of an electronic device, such as an electronic pen, a digital handwriting of a user would include ink stroke segments fluctuating from channel to channel as the tilt angle of the electronic device changed during writing by the user. In this manner, X-Y position and pressure data may be recorded as a function of time, and the tilt angle may be recorded, thus adding another level or element of biometric security to a digital signature. As shown in the example of FIG. 8, the handwritten "TEXT" of a user may be recorded to include changes in the tilt angle of a writing implement used to make the handwriting. Other types of handwritten data may also be stored beyond signature recognition/authentication.

Each channel of the multichannel hologram may include both encoded XY position information and specific angle information. The XY position information may change across the area of a channel but the angular information on a different channel is always different. The angle information may be constant within the entire area of a channel, but different between channels, while the XY position information may be constant between channels, but different within the entire area of a channel.

As an electronic device, such as an electronic pen with an optical sensor, moves across the multichannel hologram, the dot pattern reports where the device tip is in XY position units. Every channel of the hologram may have the same XY grid, so at the end of a handwriting, such as a signature, the XY history of the handwriting is known. However, during the handwriting, the optical sensor will see different hologram channels which have the same XY grid but differing angles for each channel. As such, a history of angular tilt can also be determined.

Figure 9:
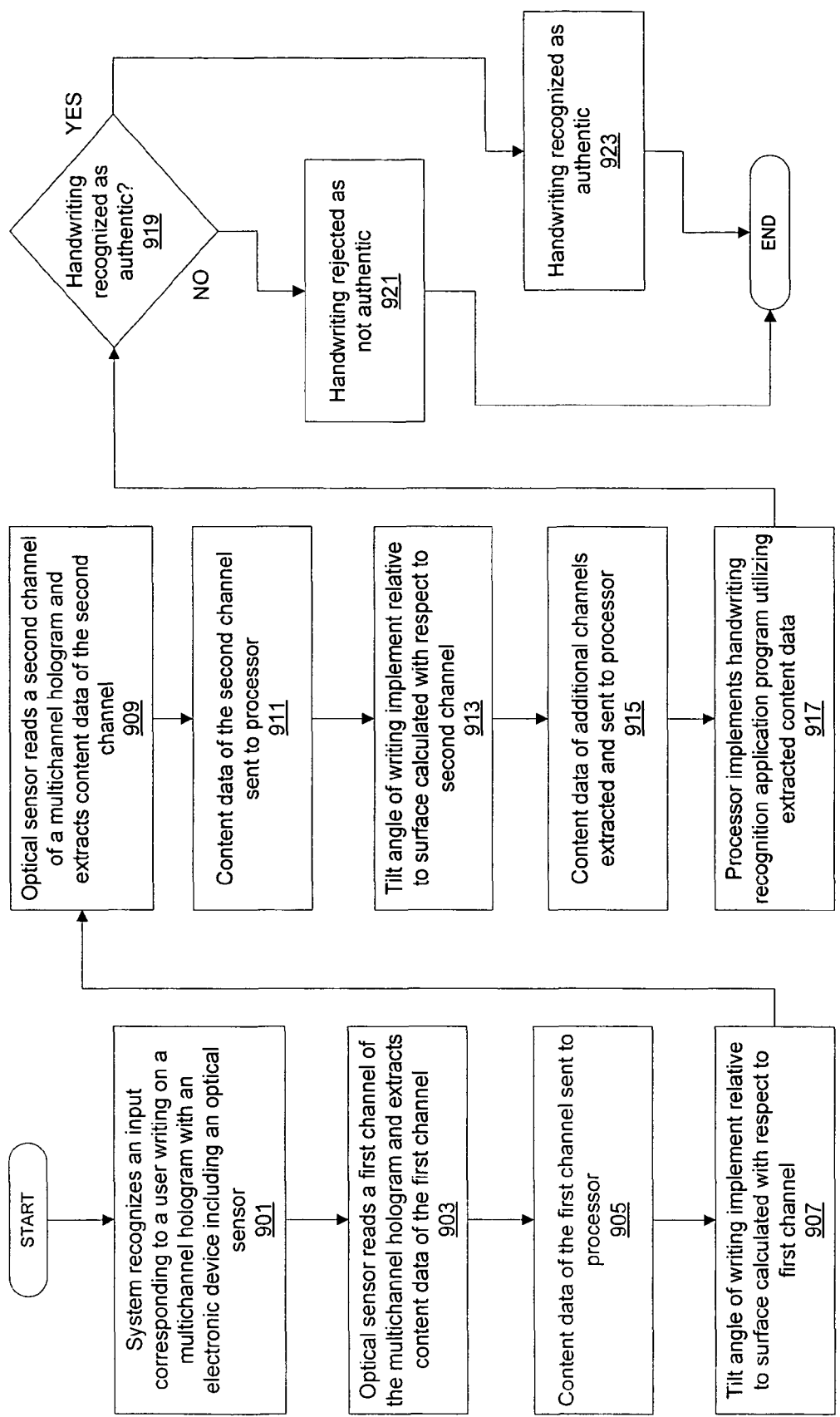
FIG. 9 is a flowchart of an illustrative example of a method for digital signature recognition in accordance with at least one aspect of the present invention.

FIG. 9 is a flowchart of an illustrative example of a method for digital handwriting, such as a digital signature, recognition in accordance with at least one aspect of the present invention. At step 901, an input corresponding to a user writing on a multichannel hologram with an electronic device including an optical sensor is recognized. At step 903, the optical sensor reads a first channel of the multichannel hologram and extracts content data at the first channel. The content data may include the tilt angle data at a particular time as well as the XY position data.

At step 905, the content data of the first channel is sent to a processor. The processor then, at step 907, calculates the tilt angle of the writing implement relative to a surface with respect to the content data of the first channel. The method moves to step 909 where the optical sensor reads a second channel of the multichannel hologram and extracts content data at the second channel. Moving to step 911, the extracted content data of the second channel is sent to the processor. Then at step 913, the tilt angle of the writing implement relative to the surface is calculated based upon the extracted content data of the second channel. As necessary, at step 915, content data of additional channels are extracted and sent to the processor and the corresponding tilt angle at each additional channel is calculated.

The process proceeds to step 917 where the processor implements a handwriting recognition application program utilizing the extracted content data from the various channels of the multichannel hologram. Moving to step 919, a determination is made as to whether the handwriting is recognized as authentic based at least in part on the calculated tilt angle of the writing implement at the various channels. Such a step may occur where the XY position history of handwriting is checked against a known handwriting. If the handwriting is not recognized as authentic, the process moves to step 921 where the digital handwriting is rejected as not being authentic. Subsequent action may occur based upon such a determination. If the digital handwriting is recognized as authentic in step 919, the process proceeds to step 923 where the digital handwriting is accepted as authentic and subsequent actions may be taken based upon the authenticity of the handwriting.

Figure 10B:
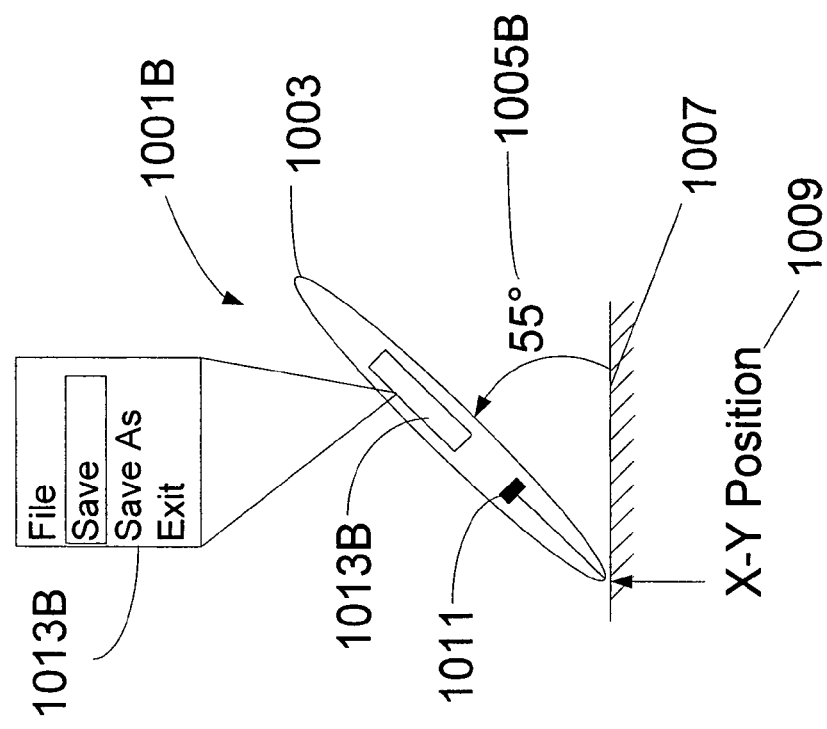
FIGS. 10A-10C illustrate examples of identifying different channels of a multichannel hologram and initiating a user interface in accordance with at least one aspect of the present invention.
Figure 10A:
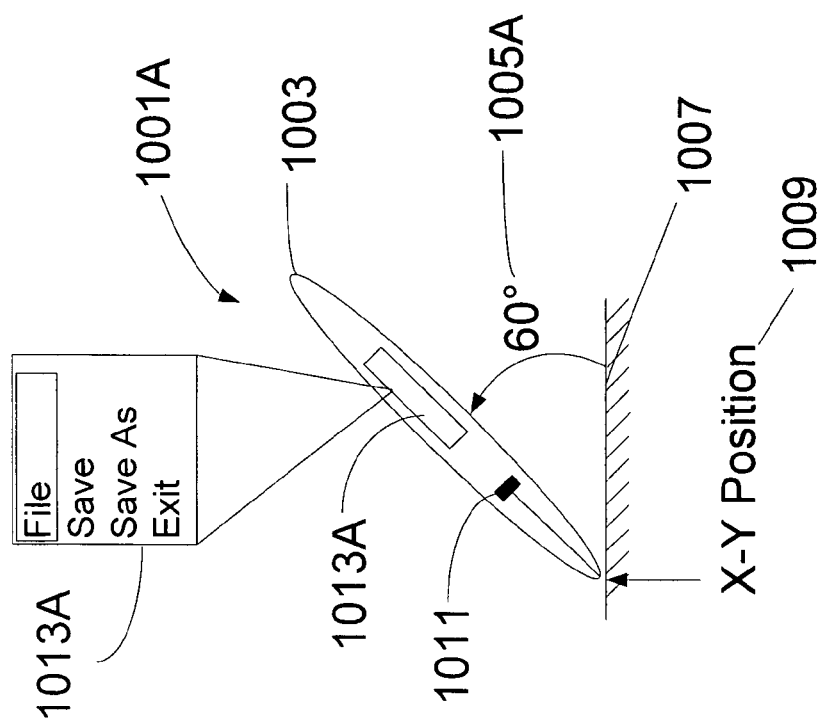
Figure 10C:
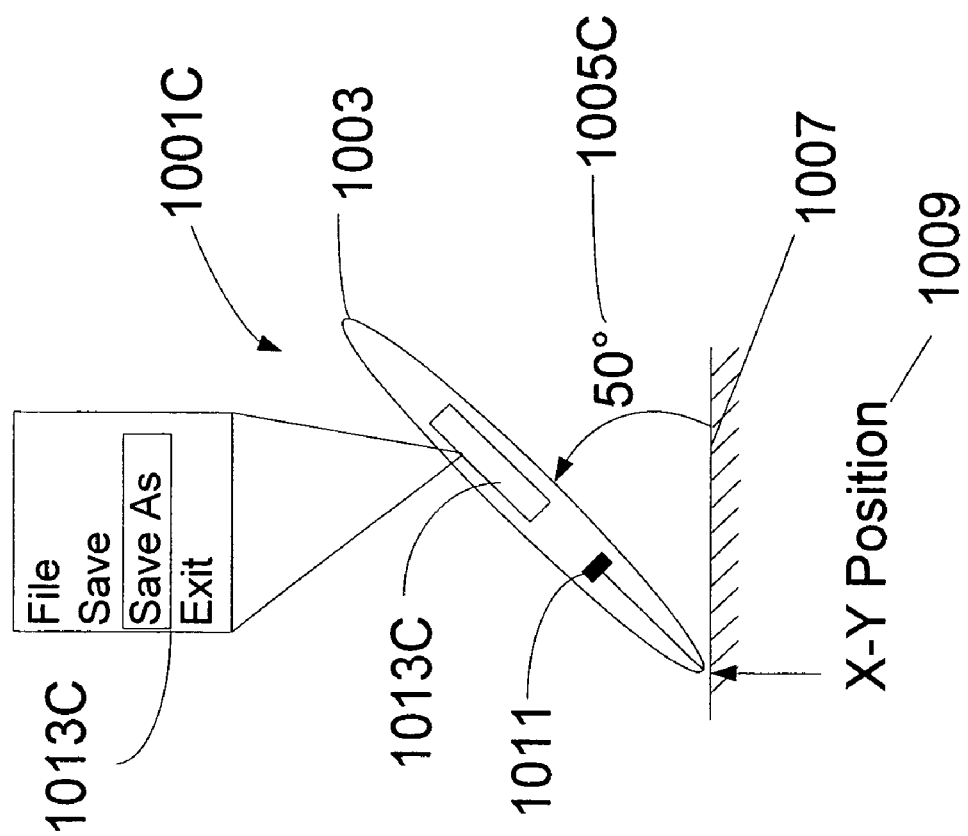

FIGS. 10A-10C illustrate examples of identifying different channels of a multichannel hologram and initiating a user interface in accordance with at least one aspect of the present invention. Digital data corresponding to user interface elements may be encoded into a multichannel hologram 1007 which may be read by an optical sensor 1011 of an optical device 1003. The encoded digital data may be in prepared surfaces such as paper. The multichannel hologram 1007 is oriented at an angle to an optical device 1003 which reads a pattern of symbols, such as dots, lines, etc, on one channel of the multichannel hologram 1007. Optical device 1003 may be an electronic pen with a built in optical sensor 1011 configured to read content data at various channels. Although not shown in this example, optical device 1003 may include a light source for use in reading digital content data invisible to the human eye.

If the relative angle between the multichannel hologram 1007 and the optical device 1003 changes by a threshold amount, another channel of content data comes into view of the optical sensor 1011, while the previous channel fades out. By changing the relative angle between the multichannel hologram 1007 and the optical device 1003, multiple different channels may be read by the optical device 1003, effectively multiplying the amount of area available for data encoding by the number of channels in the multichannel hologram 1007. It should be understood by those skilled in the art that, in accordance with at least one aspect of the present invention, each channel of the multichannel hologram may be read within a range of relative angles between the multichannel hologram 1007 and the optical device 1003. For example, when the optical device 1003 is positioned over an X-Y position 1009 of a multichannel hologram 1007 at a relative angle between 55° and 60° a first channel of content data may be read while, when positioned at a relative angle between 55° and 50°, a second channel of content data may be read.

In scenario 1001A, optical device 1003 is positioned over an X-Y position 1009 of a multichannel hologram 1007 at an angle 1005A of 60° with reference to the hologram 1007. At angle 1005A, a visible pattern channel may be read by an optical sensor 1011 of the optical device 1003. The visible pattern channel may correspond to user interface elements 1013A that may be displayed on a display of the optical device 1003. Since a different channel is seen by the optical sensor 1011 when the optical device 1013 is tilted to a different angle 1005, different data may be shown on the display of the optical device 1003, enabling menu selections. A user can select the particular user interface element, for example, by pressing the optical device 1003 harder against the hologram 1007. Other manners including an actuation switch on the optical device 1003 itself may be used in the alternative. The present invention is not so limited to the examples provided herein.

In scenario 1001B, the angle 1005B of the optical device 1003 has been changed to 55°. At angle 1005B, a different visible pattern channel may be read by optical sensor 1011 of the optical device 1003. The visible pattern channel may correspond to user interface elements 1013B that may be displayed on the display of the optical device 1003. Finally, in scenario 1001C, the angle 1005C of the optical device 1003 has been changed to 50°. At angle 1005C, a different visible pattern channel may be read by the optical sensor 1011 of the optical device 1003. The visible pattern channel may correspond to user interface elements 1013C that may be displayed on the display of the optical device 1003. Although shown with reference to an electronic pen in these examples, it should be understood by those skilled in the art that an optical sensor 1011 may alternatively be included within a trackball, optical mouse, or other types of electronic devices.

Figure 11:
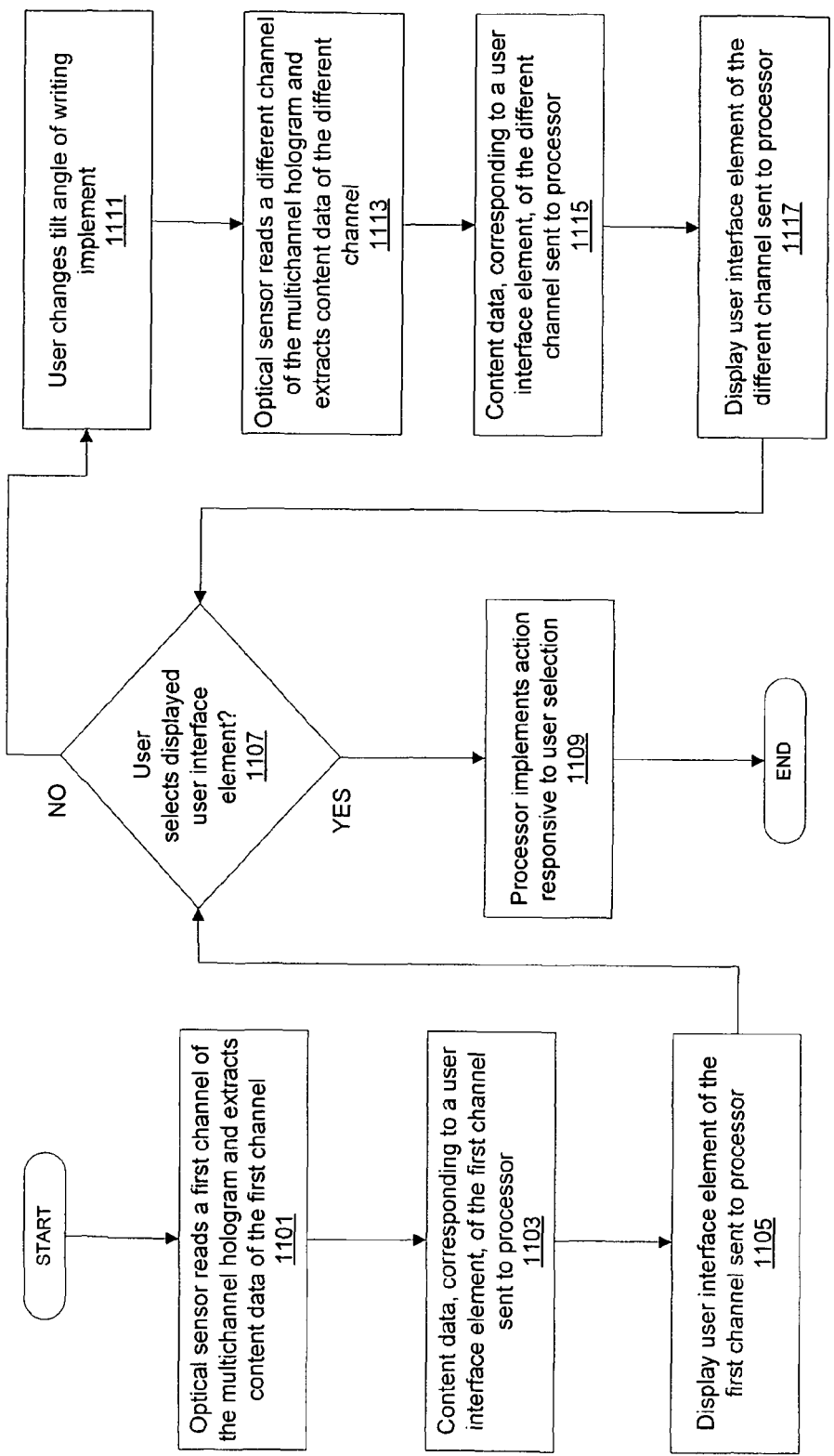
FIG. 11 is a flowchart of an illustrative example of a method for identifying different channels of a multichannel hologram and initiating a user interface in accordance with at least one aspect of the present invention.

FIG. 11 is a flowchart of an illustrative example of a method for identifying different channels of a multichannel hologram and initiating a user interface in accordance with at least one aspect of the present invention. The process begins at step 1101 where an optical sensor reads a first channel of a multichannel hologram and extracts content data found at the first channel. At step 1103, the extracted content data of the first channel is sent to a processor. In this example, the extracted content data may correspond to a user interface element, such as the examples shown in FIGS. 10A-10C. The process then proceeds to step 1105 where the user interface element of the first channel that was sent to the processor is displayed on a display of an optical device. The optical device may be configured to include the optical sensor used to read and extract the content data in step 1101.

Moving to step 1107, a determination is made as to whether a user has selected a particular user interface element. For example, the first channel of the multichannel hologram may provide a user interface element showing four options with one option highlighted. For example, user interface elements 1013A as shown in FIG. 1OA may be displayed with the particular user interface element of "File" highlighted. Selection of a user interface element by the user in step 1107 may include the depression of the optical device against the hologram and/or activation of an input switch on the optical device itself. Other manners beyond those described herein for selection of a user interface element should be understood by those skilled in the art. If a particular user interface element has been selected at step 1107, the process moves to step 1109 where the processor implements an action corresponding to the selected user interface element. For example, with respect to FIG. 10A, an additional drop down menu corresponding to the activation of the "File" menu may appear on the display of the optical device.

If no selection has been made by the user in step 1107, the process moves to step 1111 where a user changes the tilt angle of the writing implement/optical device. Such an example may be seen when transitioning between scenario 1001A and 1001B in FIGS. 10A and 10B. At step 1113, the optical sensor reads a different channel of the multichannel hologram and extracts content data stored at the different channel. At step 1115, the extracted content data of the different channel is sent to the processor. The process then proceeds to step 1117 where the user interface element of the different channel that was sent to the processor is displayed on the display of the optical device. The process continues by proceeding back to step 1107.

Figure 12A:
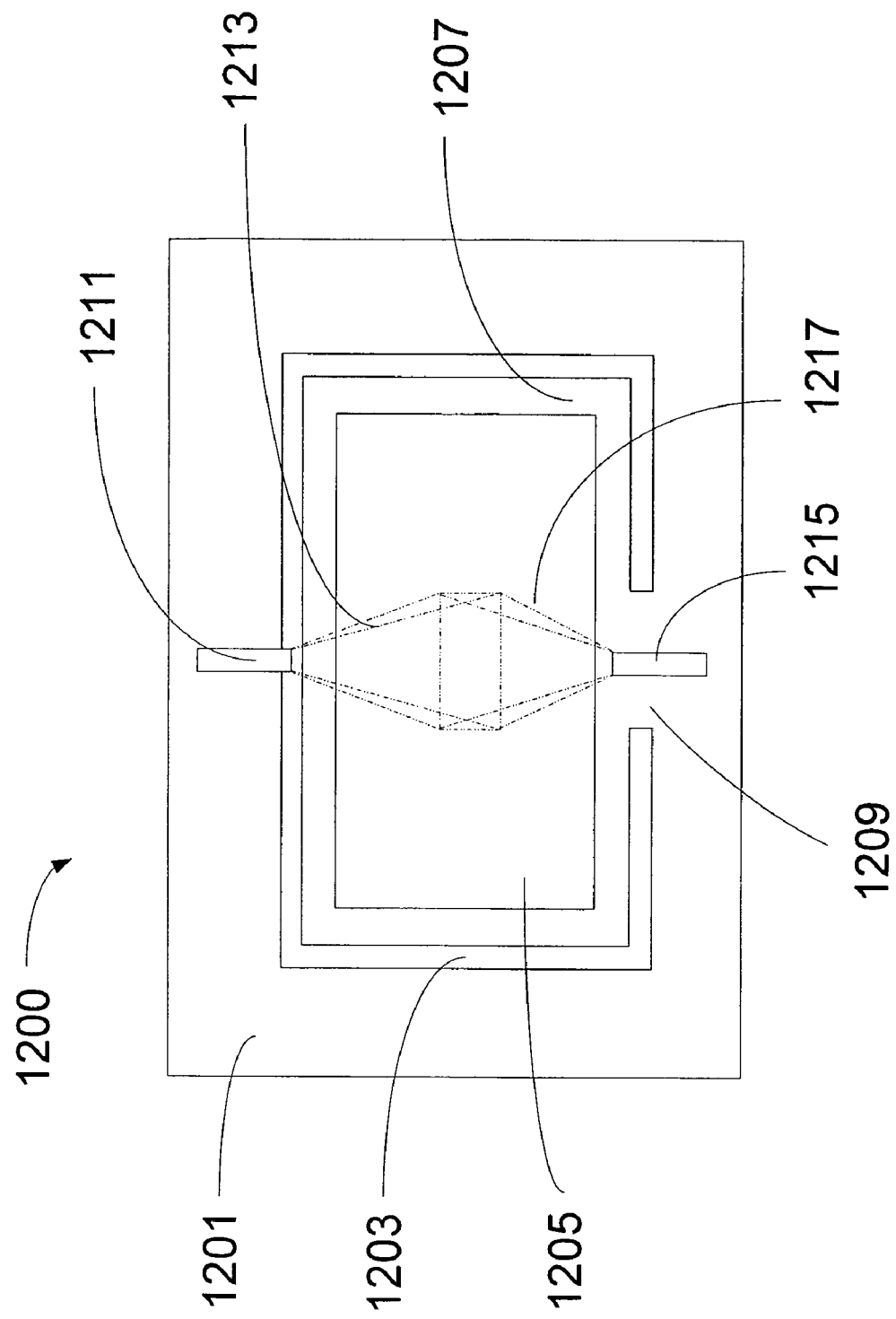
FIGS. 12A and 12B illustrate an example of an accelerometer/gyroscope utilizing a multichannel hologram in accordance with at least one aspect of the present invention.
Figure 12B:
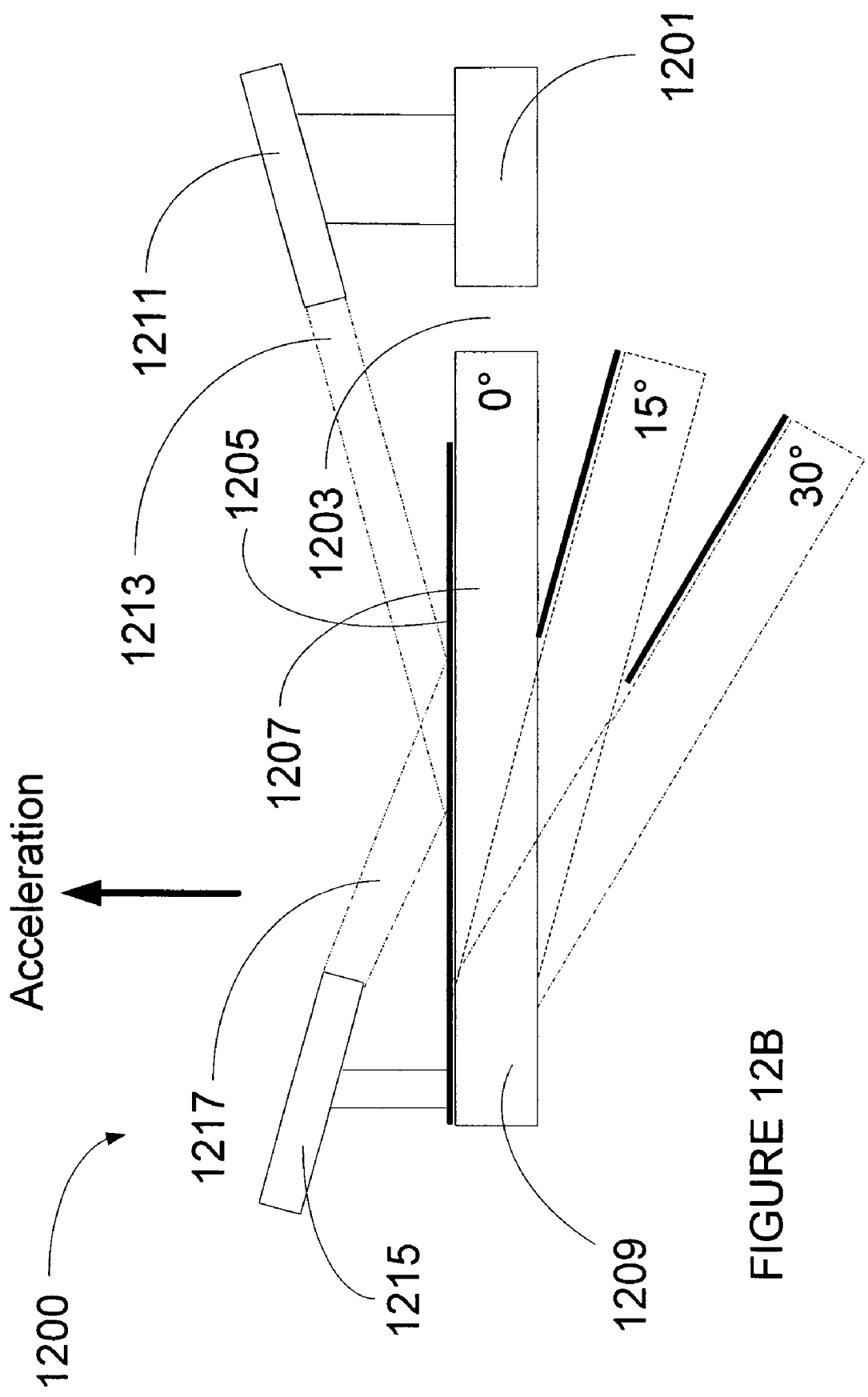

FIGS. 12A and 12B illustrate an example of an accelerometer/gyroscope utilizing a multichannel hologram in accordance with at least one aspect of the present invention. FIG. 12A illustrates a system 1200 including a pendulum 1207 with a multichannel holograph label 1205 mounted to the pendulum. The pendulum 1207 may be fixed by a cantilever-fashion hinge 1209 to a frame 1201. As used herein, a hinge, such as hinge 1209, may include a stiff or flexible web. The frame 1201 includes an outer portion and the pendulum 1207. The pendulum 1207 is separated from the outer portion by an opening 1203. Opening 1203 between the pendulum 1207 and the frame 1201 allows for movement of the pendulum when acted upon by a force. In this example, the opening 1203 is rectangular in shape, separating the pendulum 1207 from the frame 1201 except at the hinge 1209. An optical sensor 1211 is shown mounted to the frame 1201. The optical sensor 1211 is shown with a field of view 1213 represented in broken lines. The optical sensor may be configured to view a portion of the hologram 1205 mounted to the pendulum 1207.

An illumination source 1215 is shown mounted to the hinge 1209. Illumination source 1215 is shown with an illumination field 1217 represented in broken lines. Illumination source 1215 may be configured to illuminate a portion of the hologram 1205 mounted to the pendulum 1207. Examples of illumination sources 1215 include ambient light, directed light, incoherent light, laser light, incandescent light, fluorescent light, visible light, infrared light, and ultraviolet light, among others. It should be understood by those skilled in the art that other configuration for an illumination source 1215 may be utilized, such as along a different region of the frame 1201. In accordance with other embodiments, as illumination source 1215 may be ambient light, no physical structure connected to the hinge 1209, frame 1201, or other component of system 1200 may exist.

As shown in FIG. 12B, when the system 1200 is subjected to a force that creates a linear and/or rotational acceleration, the inertia of the pendulum 1207 causes the pendulum 1207 and the hologram 1205 mounted to it to lag behind the motion of the frame 1201. The lag is proportional to the acceleration the system 1200 experiences and is a function of the mass and hinge 1209 geometry. The optical sensor 1211 reads data corresponding to the acceleration as a change in the content data e.g., stored within the different channels, in the multichannel hologram. The optical sensor 1211 may be configured to read and extract channel data at predefined times and/or at any point in which a new channel may be read. In FIG. 10B, the optical sensor 1211 may read and extract the content data of a channel of the multichannel hologram 1205 when the relative angle of the pendulum 1207 and hologram 1205 to an initial position is 0° for a first channel, 15° for a second channel, and 30° for a third channel. The content data for each of the first, second, and third channels may be FIGS. 6A-6C as one example. A processor operatively connected to the optical sensor 1211 may calculate the amount of force that the system 1200 was subjected to based in part on the extracted content data and time between reads of the channels of the multichannel hologram 1205. It should be understood by those skilled in the art that the field of view 1217 of the illumination source 1215 may be configured different that that shown in the FIG. 12B in order to cover those situations in which the field of view changes as the position of the pendulum 1207 changes.

Various configurations of the pendulum 1207, hologram 1205, optical sensor 1211, gap 1203, field of view 1213, hinge 1209, illumination source 1215, illumination field 1217, and the frame 1201 may be arranged. Those skilled in the art should appreciate that the present invention is not limited to any one configuration. For example, the optical sensor 1211 may be configured to be operatively connected to the frame 1201 while being located within the gap 1203 region in order to lower the profile of the entire system 1200. The density and/or thickness of the various components and the quality, geometry, and collimation of the illumination may be changed in order to make the system 1200 more or less sensitive, enabling an increased or reduced resolution, thus making the system 1200 more or less accurate with respect to calculating the applied force. Such a use of an accelerometer/gyroscope may be used in various applications including aircraft, product packaging, inertial navigation, test equipment and measurement devices, and aerodynamics.

Figure 13:
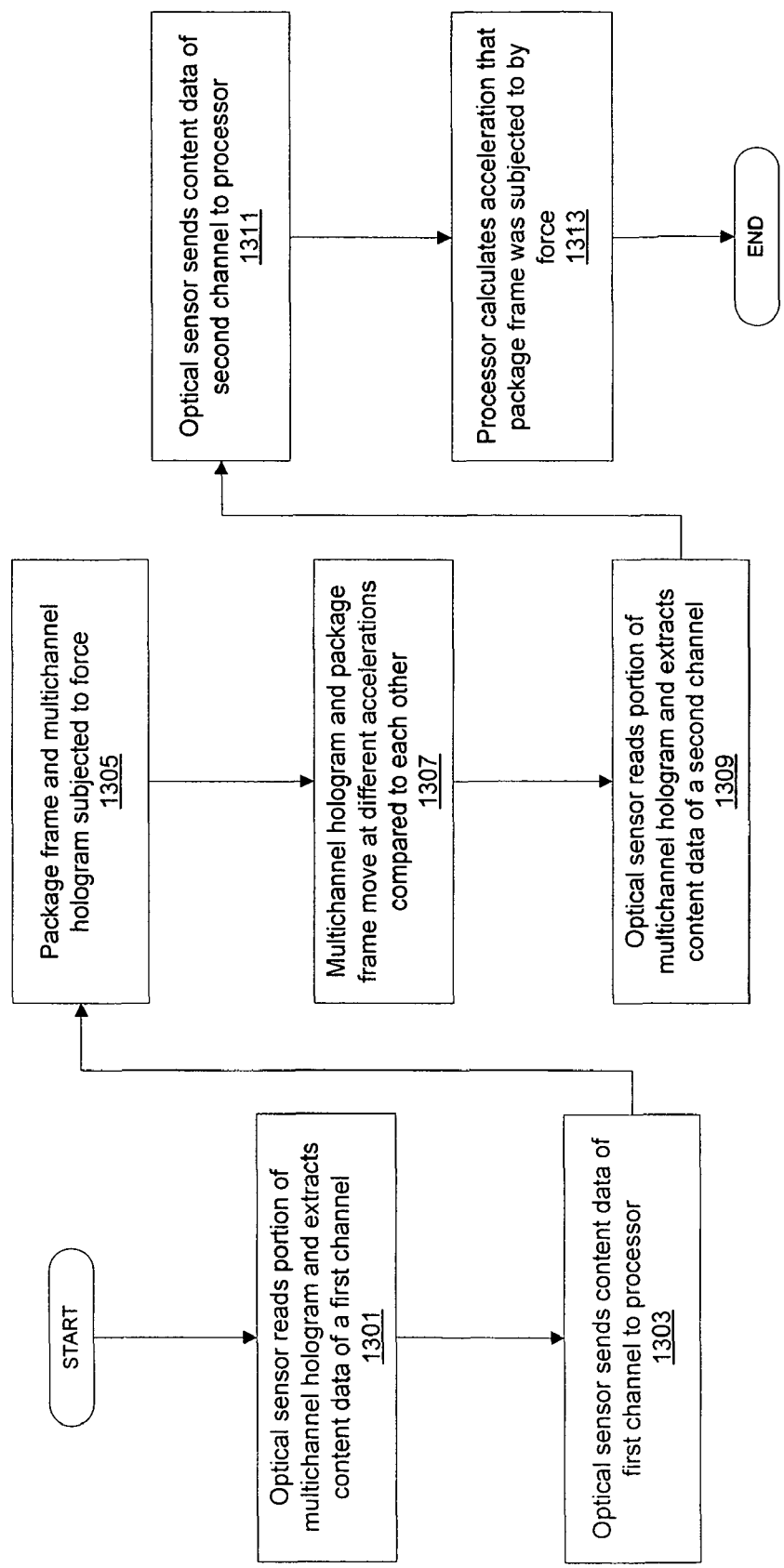
FIG. 13 is a flowchart of an illustrative example of a method for calculating acceleration of an object subjected to a force in accordance with at least one aspect of the present invention.

FIG. 13 is a flowchart of an illustrative example of a method for calculating acceleration of an object subjected to a force in accordance with at least one aspect of the present invention. The process starts at step 1301 where an optical sensor reads a portion of a multichannel hologram and extracts content data of a first channel of the hologram. At step 1303, the optical sensor sends the extracted content data of the first channel to a processor as an initial or baseline point for calculation purposes. Moving to step 1305, a package frame of a product is subjected to an applied force. As described above, the configuration of the optical sensor and other components may be done in order to calculate a linear and/or a rotational force applied.

At step 1307, the multichannel hologram mounted on a pendulum and the package frame move at different accelerations compared to each other. As described above, the motion of the pendulum and hologram lag behind the motion of the package frame when subjected to a force. Proceeding to step 1309, the optical sensor reads another portion of the multichannel hologram and extracts content data of a second channel of the hologram. At step 1311, the optical sensor sends the extracted content data of the second channel to the processor. Finally, at step 1313, the processor calculates the acceleration that the package frame was subjected to by the force. With that information, the force itself may be calculated as well. Although not shown in the example of FIG. 13, additional readings and extractions of content data at different channels may also be made and sent to the processor for calculations purposes. Such a system and method allows for the development of a sensor for calculating applied forces and accelerations and determination of forces applied and determination of better manners for protecting products from vibration and other movements/impacts.

Figure 14:
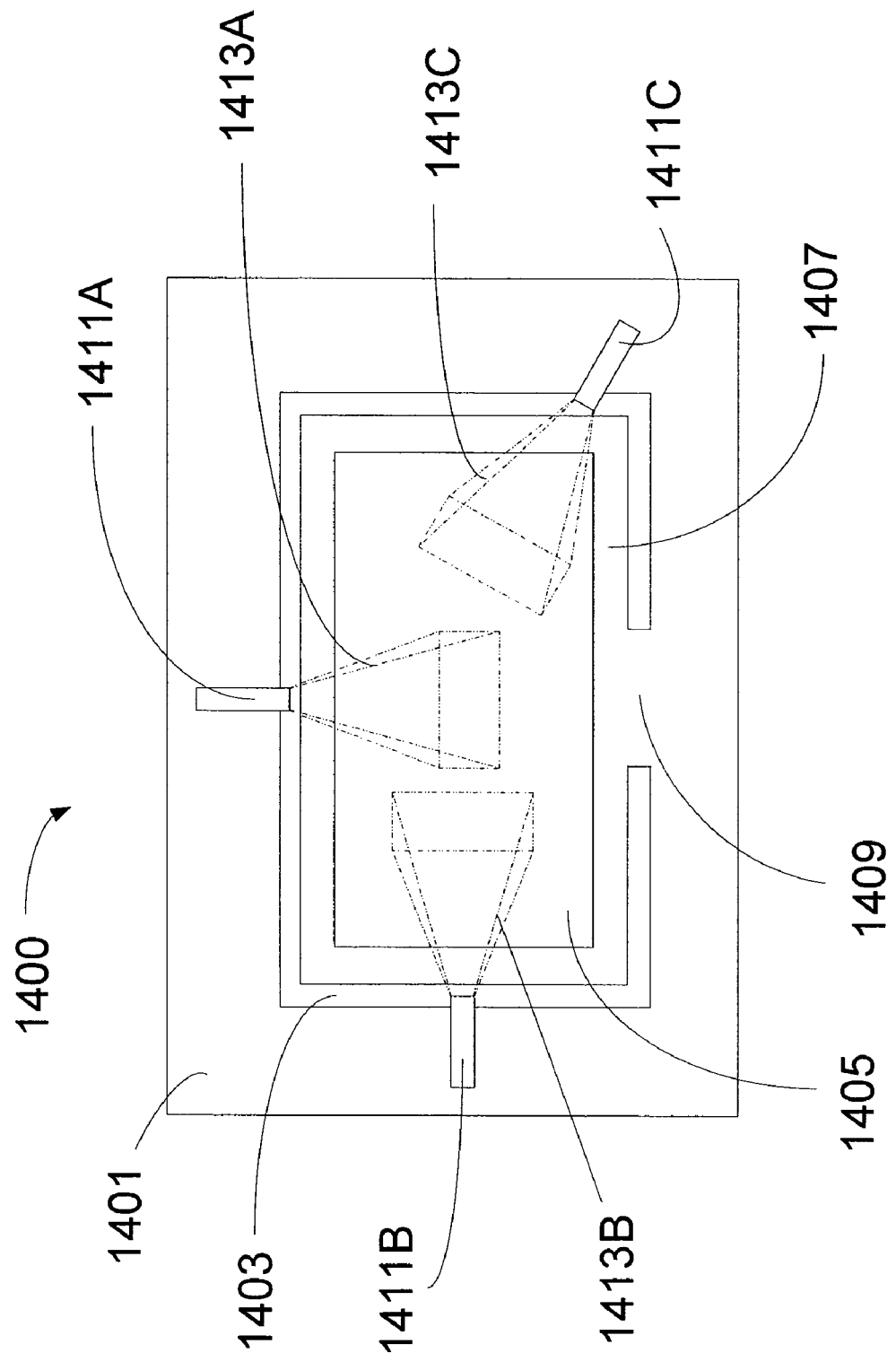
FIG. 14 illustrates another example of an accelerometer/gyroscope utilizing a multichannel hologram in accordance with at least one aspect of the present invention.

FIG. 14 illustrates another example of an accelerometer/gyroscope utilizing a multichannel hologram in accordance with at least one aspect of the present invention. FIG. 14 illustrates a system 1400 including a pendulum 1407 with a multichannel holograph label 1405 mounted to the pendulum. The pendulum 1407 may be fixed by a cantilever-fashion hinge 1409 to a frame 1401, such as a package frame or channel of a package frame. An opening 1403 between the pendulum 1407 and the frame 1401 allows for movement of the pendulum when acted upon by a force. Three optical sensors 1411A-1411C are shown mounted to the frame 1401 at different configurations. The optical sensors 1411A-1411C are shown with different respective field of views 1413A-1413C represented in broken lines. The optical sensors 1411A-1411C each may be configured to view a different portion of the hologram 1405 mounted to the pendulum 1407. In an alternative embodiment, one or more of the optical sensors 1411A-1411C may also be configured to have at least partially overlapping field of views 1413A-1413C.

Similarly as in FIGS. 12A-12B, when the system 1400 is subjected to a force that creates a linear and/or rotational acceleration, the inertia of the pendulum 1407 causes the pendulum 1407 and the hologram 1405 mounted to it to lag behind the motion of the frame 1401. The lag is proportional to the acceleration the system 1400 experiences and is a function of the mass and hinge 1409 geometry. The optical sensors 1411A-1411C read data corresponding to the acceleration as a change in the content data, different channels, in the multichannel hologram 1405. The optical sensors 1411A-1411C may be configured to read and extract channel content data at predefined times and/or at any point in which a new channel may be read.

Various configurations of the pendulum 1407, hologram 1405, optical sensors 1411A-1411C, gap 1403, field of views 1413A-1413C, hinge 1409, and the frame 1401 may be arranged. Those skilled in the art should appreciate that the present invention is not limited to any one configuration and is not so limited to any particular number of optical sensors 1411A-1411C. For example, multiple optical sensors 1411A-1411C may be configured to have field of views 1413A-1413C that cover the entire region of the multichannel hologram 1405. In addition, the optical sensors may be configured to have a field of view over the same portion of the multichannel hologram while reading different channels of that portion.

Figure 15:
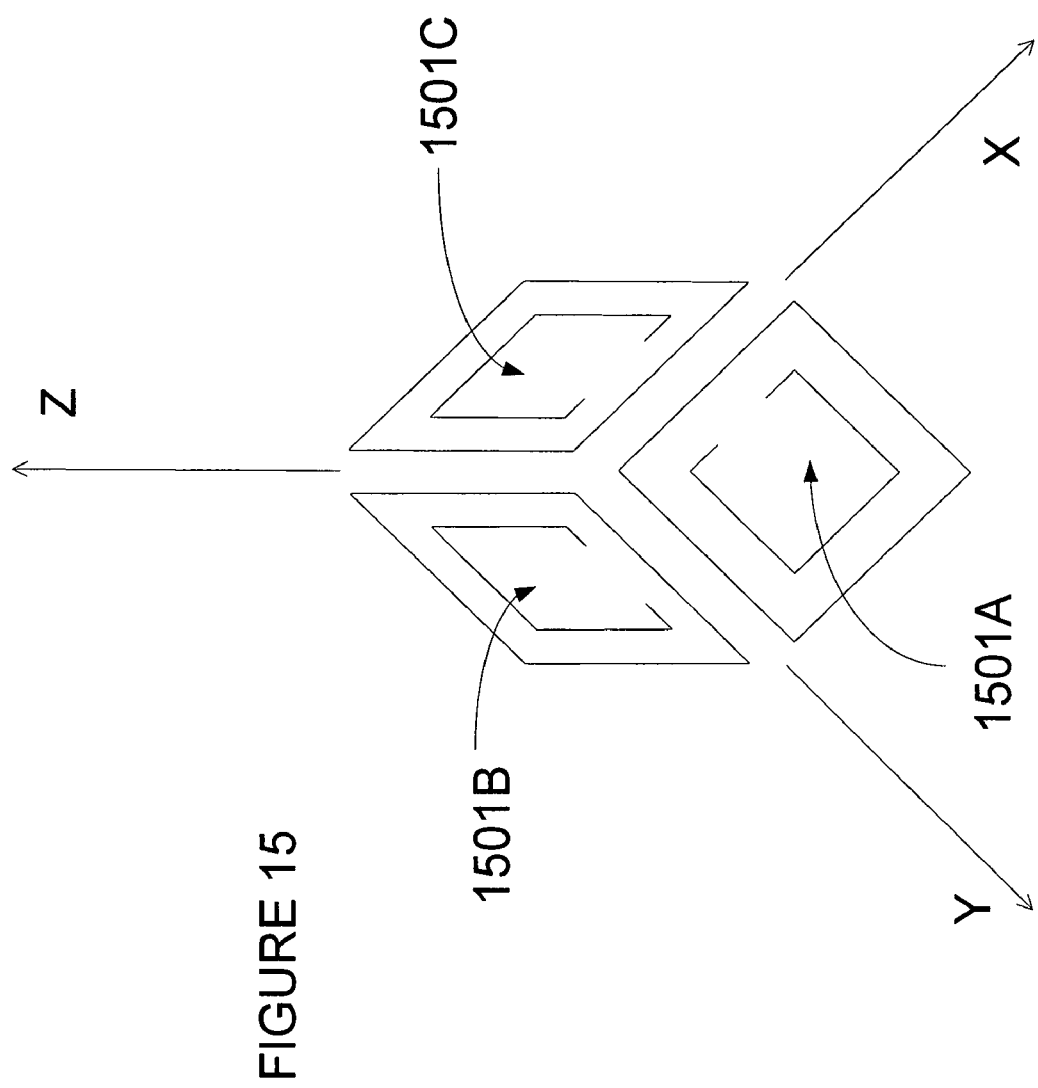
FIG. 15 illustrates another example of an accelerometer/gyroscope utilizing a multichannel hologram in accordance with at least one aspect of the present invention.

FIG. 15 illustrates another example of an accelerometer/gyroscope utilizing a multichannel hologram in accordance with at least one aspect of the present invention. Each frame, multichannel hologram, light source, optical sensor combination, which amounts to a one dimensional acceleration/force sensor 1501, which measures one direction or one degree of freedom. The sensors 1501A-1501C may be the system 1400 shown and described in FIG. 14. Combining two, such as 1501A and 1501B, or three, such as 1501A, 1501B, and 1501C, of these one dimensional sensors in orthogonal directions enables a two dimensional or a three dimensional accelerometer. FIG. 15 illustrates coupling three one dimensional sensors 1501A-1501C, each showing the generally C-shaped slit forming the pendulum. The sensor 1501A in the XY plane may be configured to measure Z acceleration, the sensor 1501B in the YZ plane may be configured to measure X acceleration, and the sensor 1501C in the XZ plane may be configured to measure Y acceleration. For a two dimensional sensor, two of the three sensors may be used.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A system for providing digital handwriting recognition, the system comprising:
   a memory storage; and
   a processing unit coupled to the memory storage, wherein the processing unit is configured to:
      read a first channel of a multichannel hologram, the first channel comprising a first set of encoded patterns;
      extract first content data stored in the first channel, the first content comprising a first read portion of the first set of encoded patterns and a first coordinate position within the first channel;
      determine whether a relative angle between the multichannel hologram and an optical device has changed more than a threshold amount, the optical device comprising an electronic pen operative to read the multichannel hologram;
      when the relative angle between the multichannel hologram and the optical device has changed more than the threshold amount, read at least one second channel of the multichannel hologram, the at least one second channel being determinable by an amount of change in the relative angle between the multichannel hologram and the optical device;
      extract second content data stored in the at least one second channel, the second content data comprising a second read portion of a second set of encoded patterns stored in the at least one second channel and a second coordinate position within the second channel; and
      determine an authentic digital handwriting based upon a comparison of the extracted first content data, the extracted second content data, and a known handwriting, the determination including a history of variations in the relative angle between the multichannel hologram and the optical device.

2. The system of claim 1, wherein the processing unit is further configured to calculate a first tilt angle of the optical device relative to the multichannel hologram based upon the extracted first content data.

3. The system of claim 2, wherein the processing unit is further configured to calculate a second tilt angle of the optical device relative to the multichannel hologram based upon the extracted second content data.

4. The system of claim 3, wherein the processing unit being configured to determine the authentic digital handwriting further comprises the processing unit being configured to determine the authentic digital handwriting based upon the calculated first tilt angle and the calculated second tilt angle.

5. The system of claim 1, wherein the processing unit is further configured to send the extracted first content data and the extracted second content data to a processor.

6. The system of claim 1, wherein the processing unit is further configured to record the authentic digital handwriting, wherein the first content data and the second content data correspond to a first angle and a second angle, respectively, of a field of view of the optical device relative to the multichannel hologram.

7. A method for providing digital handwriting recognition, the method comprising:
  reading a first channel of a multichannel hologram, the first channel comprising a first set of encoded patterns;
  extracting first content data stored in the first channel, the first content comprising a first read portion of the first set of encoded patterns and a first coordinate position within the first channel;
  determining whether a relative angle between the multichannel hologram and an optical device has changed more than a threshold amount, the optical device comprising an electronic pen operative to read the multichannel hologram;
  in response to determining that the relative angle between the multichannel hologram and the optical device has changed more than the threshold amount, reading at least one second channel of the multichannel hologram, the at least one second channel being determinable by an amount of change in the relative angle between the multichannel hologram and the optical device;
  extracting second content data stored in the at least one second channel, the second content data comprising a second read portion of a second set of encoded patterns stored in the at least one second channel and a second coordinate position within the second channel; and
  determining an authentic digital handwriting based upon a comparison of the extracted first content data, the extracted second content data, and a known handwriting, the determination including a history of variations in the relative angle between the multichannel hologram and the optical device.

8. The method of claim 7, further comprising calculating a first tilt angle of the optical device relative to the multichannel hologram based upon the extracted first content data.

9. The method of claim 8, further comprising calculating a second tilt angle of the optical device relative to the multichannel hologram based upon the extracted second content data.

10. The method of claim 9, wherein determining the authentic digital handwriting further comprises determining the authentic digital handwriting based upon the calculated first tilt angle and the calculated second tilt angle.

11. The method of claim 7, further comprising sending the extracted first content data and the extracted second content data to a processor.

12. The method of claim 7, further comprising recording the authentic digital handwriting, wherein the first content data and the second content data correspond to a first angle and a second angle, respectively, of a field of view of the optical device relative to the multichannel hologram.

13. A computer-readable storage medium that stores a set of instructions which when executed perform a method for providing digital handwriting recognition, the method executed by the set of instructions comprising:
  reading a first channel of a multichannel hologram, the first channel comprising a first set of encoded patterns;
  extracting first content data stored in the first channel, the first content comprising a first read portion of the first set of encoded patterns and a first coordinate position within the first channel;
  determining whether a relative angle between the multichannel hologram and an optical device has changed more than a threshold amount, the optical device comprising an electronic pen operative to read the multichannel hologram;
  in response to determining that the relative angle between the multichannel hologram and the optical device has changed more than the threshold amount, reading at least one second channel of the multichannel hologram, the at least one second channel being determinable by an amount of change in the relative angle between the multichannel hologram and the optical device;
  extracting second content data stored in the at least one second channel, the second content data comprising a second read portion of a second set of encoded patterns stored in the at least one second channel and a second coordinate position within the second channel; and
  determining an authentic digital handwriting based upon a comparison of the extracted first content data, the extracted second content data, and a known handwriting, the determination including a history of variations in the relative angle between the multichannel hologram and the optical device.

14. The computer-readable storage medium of claim 13, further comprising calculating a first tilt angle of the optical device relative to the multichannel hologram based upon the extracted first content data.

15. The computer-readable storage medium of claim 14, further comprising calculating a second tilt angle of the optical device relative to the multichannel hologram based upon the extracted second content data.

16. The computer-readable storage medium of claim 15, wherein determining the authentic digital handwriting further comprises determining the authentic digital handwriting based upon the calculated first tilt angle and the calculated second tilt angle.

17. The computer-readable storage medium of claim 13, further comprising sending the extracted first content data and the extracted second content data to a processor.

18. The computer-readable storage medium of claim 13, further comprising recording the authentic digital handwriting, wherein the first content data and the second content data correspond to a first angle and a second angle, respectively, of a field of view of the optical device relative to the multichannel hologram.

* * * * *